(12) United States Patent
Knopf et al.

(10) Patent No.: US 8,944,522 B2
(45) Date of Patent: *Feb. 3, 2015

(54) FLANGED BEARING RING FOR THE HUB OF A MOTOR VEHICLE WHEEL AND A METHOD OF MANUFACTURING SAME

(75) Inventors: Andreas Knopf, Würzburg (DE); Paolo Re, Nichelino (IT)

(73) Assignee: Aktiebolaget SKF, Gothenburg (SE)

( * ) Notice: Subject to any disclaimer, the term of this patent is extended or adjusted under 35 U.S.C. 154(b) by 303 days.

This patent is subject to a terminal disclaimer.

(21) Appl. No.: 13/426,690

(22) Filed: Mar. 22, 2012

(65) Prior Publication Data

US 2012/0248856 A1    Oct. 4, 2012

(30) Foreign Application Priority Data

Mar. 29, 2011   (IT) .............................. TO2011A0276

(51) Int. Cl.
| | | |
|---|---|---|
| *B60B 27/00* | (2006.01) | |
| *F16C 33/64* | (2006.01) | |
| *B22D 19/04* | (2006.01) | |
| *F16C 33/76* | (2006.01) | |
| *F16C 19/18* | (2006.01) | |
| *F16C 33/60* | (2006.01) | |

(52) U.S. Cl.
CPC ............ *B60B 27/0005* (2013.01); *B22D 19/04* (2013.01); *B60D 27/0073* (2013.01); *F16C 33/64* (2013.01); *F16C 33/768* (2013.01); *F16C 19/184* (2013.01); *F16C 33/60* (2013.01); *B60B 2360/102* (2013.01); *B60B 2360/104* (2013.01); *B60B 2360/32* (2013.01); *B60B 2900/5114* (2013.01); *B60Y 2200/11* (2013.01); *F16C 2326/02* (2013.01)

USPC .......................... 301/109; 384/544; 384/492

(58) Field of Classification Search
CPC ........ F16C 33/60; F16C 33/605; F16C 33/64; F16C 33/72; F16C 33/768; B60B 27/0073; B60B 27/0094
USPC ............ 301/105.1, 109, 110, 110.6; 384/492, 384/515, 544, 564

See application file for complete search history.

(56) References Cited

U.S. PATENT DOCUMENTS 3,583,511 A * 6/1971 Asberg ........................ 180/370
4,715,780 A * 12/1987 Kan .............................. 415/200
6,497,515 B1 * 12/2002 Sahashi et al. ............... 384/544

(Continued)

FOREIGN PATENT DOCUMENTS

| EP | 0297552 A2 | 1/1989 |
| WO | WO2008147284 A1 | 12/2008 |
| WO | WO2010063299 A1 | 6/2010 |

*Primary Examiner* — Kip T Kotter
(74) *Attorney, Agent, or Firm* — Bryan Peckjian; SKF USA Inc. Patent Dept.

(57) ABSTRACT

A flanged bearing ring (10) for the wheel of a motor vehicle includes two different materials joined as a single piece: a tubular core (15) and an outer body (16) around the core. The outer body forms a radial flange (17) and is made of a lighter material than that of the core. At the axially outer end of the ring, at the side where the flange (17) is provided, the interface surfaces between the external body (16) and the core (15) terminate in a groove (21) formed partly in the outer body and partly in the core. The groove (21) accommodates a sealing ring of polymeric material (22) which is cast and continuously covers a circular separation line (23) at the axially outer end of the interface between the core (15) and the outer body (16).

9 Claims, 1 Drawing Sheet

(56) References Cited

U.S. PATENT DOCUMENTS 6,971,177 B2 * 12/2005 Ozawa et al. ............ 29/898.062
2003/0210842 A1 * 11/2003 Tajima et al. ................. 384/544
2006/0284475 A1 * 12/2006 Kanehisa et al. .......... 301/110.5
2010/0331093 A1    12/2010 Ozawa et al.

* cited by examiner

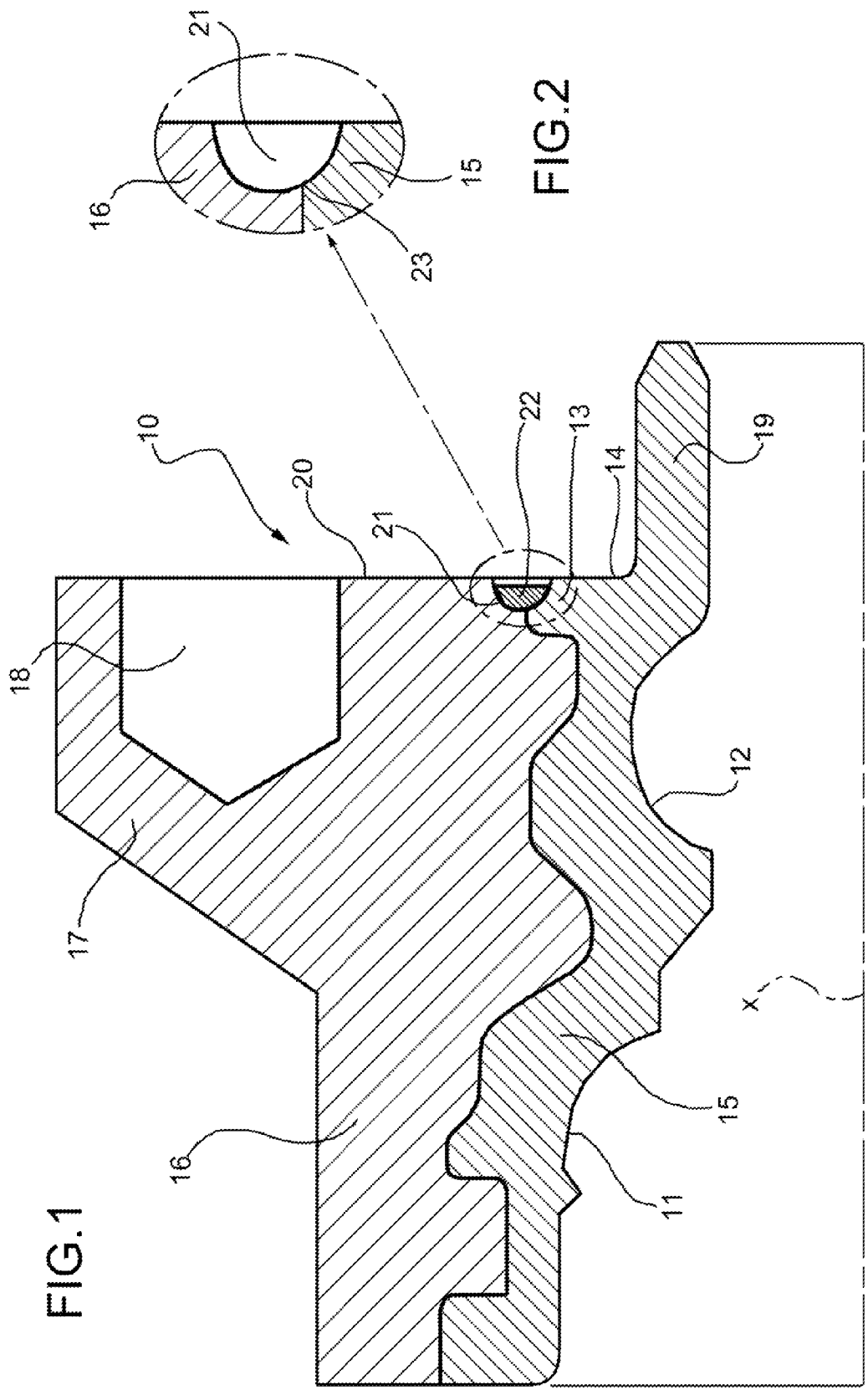

FLANGED BEARING RING FOR THE HUB OF A MOTOR VEHICLE WHEEL AND A METHOD OF MANUFACTURING SAME

CROSS-REFERENCE TO RELATED APPLICATION

This United States Non-Provisional Utility application claims the benefit of copending Italy Provisional Patent Application Serial No. TO2011A000276, filed on 29 Mar. 2011, which is incorporated herein in its entirety.

FIELD OF THE INVENTION

The present invention relates to a lightweight, flanged bearing ring for the hub of a motor vehicle wheel, particularly a rotatable ring with a flange providing connection to the wheel and/or the brake rotor. The invention also relates to a method of manufacturing a bearing ring of the aforementioned type.

SUMMARY OF THE INVENTION

The motorcar industry has to comply with an ever increasing demand for weight reduction in motor vehicle components for the sake of cutting down fuel consumption and exhaust emissions. With a vehicle wheel bearing, weight reduction may not imply any reduction in strength and safety. The raceways must be made of a material hard enough to resist the stresses of rolling contact. Conventional bearing grade steel is still widely used. The raceways are heat treated so as to attain a level of hardness and microstructure homogeneity adequate to withstand the stresses caused by rolling Hertzian contact.

Recent flanged bearing rings include a radially inner, annular or tubular insert (or core) made of bearing steel and forming one or two raceways and a radially outer body forming a radially outwardly extending flange around the insert and made of a lightweight material such as aluminium alloy. The lightweight flange is designed to mount the wheel and/or the brake rotor and transfer loads from these components to the tubular insert.

WO 2008/147284 A1 discloses a bearing ring made up of two different materials joined together in a single piece, namely a first, high toughness material such as bearing steel forming the raceways and a second, lightweight material, such as a lightweight metal, forming the rest of the ring. The second material is joined to the first material by a semi-solid casting process.

It has been observed that, with bearing rings of the above type, a weak point is given by the area where the interface surface between the two parts of different materials (tubular steel core, outer body of lightweight material) opens on the axially outer side, or outboard side of the bearing. In working conditions, openings along the interface surface between the two different materials tend inevitably to form.

In working conditions, the loads coming from the wheel transmit to the flange of the light-alloy outer body a bending moment which tends to separate the outer body from the core. Furthermore, repeated cycles of thermal stresses cause a differential thermal expansion between the outer body made of aluminium and the steel core, which has a coefficient of thermal expansion lesser than that of aluminium alloys. The infiltration of contaminants such as water, dust, salt, over time causes micro-cracks to broaden and the formation of rust. Experimental tests carried out by the Applicant have shown the occurrence of problems of galvanic corrosion with the use of certain types of light alloy, having a considerable difference in electrochemical potential than the steel. Salt, or even more simply water, can in fact be an electrolytic means having a high capability of penetration in micro-cracks. Because of all these factors, there is a risk that the coupling between the outer body of light alloy and steel core deteriorates, resulting in fretting (sliding) and possibly failure of the flanged ring.

It is a primary object of the present invention to provide a bearing ring made of two parts of different materials coupled together in a reliable, long-lasting ad watertight manner, so as to overcome the inconveniences of above-mentioned state of the art.

The above and further objects and advantages are attained, in accordance with the invention, by a flanged bearing ring having the features set forth in claim 1. According to another aspect of the invention, there is proposed a method as defined in claim 9. Preferred embodiments of the invention are defined in the dependent claims

BRIEF DESCRIPTION OF THE DRAWINGS

In order that the present invention may be well understood there will now be described a preferred embodiment thereof, given by way of example, reference being made to the accompanying drawings, in which:

FIG. 1 is an axial cross-sectional view of a first embodiment of a flanged bearing ring according to the invention; and FIG. 2 is an enlarged view of a detail of FIG. 1.

DETAILED DESCRIPTION OF THE INVENTION

Before an embodiment of the invention is explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including", "comprising", and "forming", and variations thereof, is meant to encompass the items listed thereafter and equivalents thereof.

Referring initially to FIG. 1, designated overall at 10 is a flanged bearing ring in accordance with an embodiment of the invention. The ring 10, in this example, is designed to be the outer, rotatable ring of a double-row angular contact ball bearing for vehicle applications, particularly for mounting to a vehicle wheel (not shown) to be rotationally supported relative to a stationary suspension standard (not shown) of the vehicle around a central axis of rotation x. Throughout the present description and the claims, terms and expressions indicating positions and directions such as "radial" and "axial" are understood as referring to the axis of rotation x of the bearing. Expressions such as "axially inner" and "axially outer" instead refer to a condition when mounted on a vehicle.

The ring 10 comprises a radially inner insert or core 15 of a generally tubular shape and a radially outer body 16 providing a radially outwardly extending flange 17 at the outboard side of the core 15. The flange 17 provides a number of bores 18 to allow connection to the vehicle wheel by means of stud bolts (not shown).

The core 15 forms two raceways 11, 12 and is made of a first, hard and tough material, preferably a bearing grade steel. The radially outer body 16 is made of a second, lightweight material. A lightweight metal is preferred, such as aluminium, magnesium, or alloys thereof. Other suitable materials for the outer body may include, but not be limited to, carbon composites or reinforced polymers. In order to provide adequate structural support to the outer body 16, the steel core 15 extends axially through the whole width of the outer body, from the inboard to the outboard side. The tubular core 15 forms an axial tubular extension or spigot 19 at its outboard side, which facilitates centering of the vehicle wheel. The spigot 19 protrudes axially from a radially outer surface 20 of the flange 17, facing an axially outer direction.

The outer body 16 is formed around the core 15 in a number of different ways, for example through a semi-solid casting process, or by sintering or casting, or die-casting. At the end of any of these processes, the lightweight material tightly copies the shape of the radially outboard surface of core 15, whereby the inner and outer bodies interlock with one another. The shape of the radially outboard surface of the core 15 is so formed as to provide a series of grooves and ridges which extend in the circumferential direction and determine the formation of complementary ridges and grooves in the outer body when this is formed around the core.

Towards the axially inner end, the core 15 forms a ridge 13 which projects in a radially outer direction and extends in a circumferential direction. The ridge 13 serves as a shoulder to oppose relative axial displacement between the outer body 16 and the core 15. The ridge 13 provides an axially outer radial surface 14 which is coplanar, or substantially coplanar, with the axially outer surface 20 of flange 17; the surface 20 defines a precise reference surface against which the wheel or brake disc will rest.

At the axially outer end ring, at the outboard side where the flange 17 is provided, the interface surface between the outer body and the core ends in a groove 21 formed partly by the outer body 16 and partly by the inner core 15. It is noted that the interface surface terminates in a position which is recessed with respect to the axially inner radial surfaces 20 of the flange 17 and 14 of the ridge 13.

The groove 21, which opens in an axially outer direction, may be obtained by turning in a terminal step of the manufacturing process of the ring, that is, after the outer body 16 has already been formed around the core 15. As an alternative, the groove 21 may be produced during the same manufacturing step in which the outer body is formed around the core, for example by means of an annular insert placed in the moulding cavity.

The groove 21 serves as a seat to accommodate a sealing ring 22 of polymeric material, preferably silicone resin, which covers continuously, along an entire circumference around the axis x, a circular separation line 23 between the steel of the core 15 and the lightweight metal of the outer body 16, where the interface surface between the two materials meets the outboard side of the ring 10. The sealing ring 22 adheres to both the steel of the core 15 and the lightweight metal of the outer body 16, and thereby hermetically seals, from the axially outer side, the interface between the two materials.

In the preferred embodiment, the sealing ring 22 does not protrude beyond the flat surface defined by faces 20 and 14, but only partially fills the groove 21. Due to this arrangement, the brake disc (not shown) does not contact the sealing ring 22, and therefore rests only against the flat surfaces 20 and possibly also surface 14. Otherwise, if the sealing ring protrudes axially beyond the surfaces 14 and 20, it could cause errors in the flatness of the braking surfaces on the brake disc. In addition, the absence of contact between the sealing ring and brake disc prevents the inconvenience that the warm brake disc can melt the polymeric material and tear it out of its seat upon removing the brake disc for servicing.

Preferably, as shown in the enlargement of FIG. 2, the groove 21 is obtained to a greater extent in the outer body of lightweight metal 16, and to a lesser extent in the ridge 13 of the core 15. Due to this arrangement, a minor quantity of the material (steel) that provides the greatest contribution in terms of structural strength is removed, and therefore the ridge 13 is not weaken to an appreciable extent.

Not necessarily the groove 21 must have a rounded profile as shown. A rounded shape is preferable if one chooses to make a groove with thin dimensions, using a thin turning tool having a rounded head.

The material forming the sealing ring 22 is applied in a liquid state, preferably by casting it in the groove 21 after having oriented the ring 10 in such a way that the surface 20 is horizontal and facing upwards. In this way, the sealing material, once solidified, does not protrude beyond the surfaces 20, 14. Owing to the application of liquid silicone, there is the certainty of sealing all micro-cracks present in the area where the interface surface between the steel core 15 and the outer body 16 opens on the outboard side of the bearing.

We claim:

1. A flanged bearing ring for a motor vehicle wheel, wherein the flanged bearing ring comprises two different materials joined together as a single piece, the flanged bearing ring comprising:
    a radially inner tubular or annular core which forms an axially inner raceway around a central axis of rotation, the radially inner tubular or annular core providing a radially outer surface and being made of a first material having a high toughness; and
    a radially outer body which is formed around said outer surface of the radially inner tubular or annular core, the radially outer body forming a radially outwardly extending flange and is made of a second material being lighter than the first material,
    wherein at an axially outer end of the flanged bearing ring where the flange is provided, interface surfaces between the radially outer body and the radially inner tubular or annular core terminate in a groove which is formed partly in the radially outer body and partly in the radially inner tubular or annular core, and that seated in the groove is a sealing ring of polymeric material which is cast and covers continuously, along an entire circumference around the central axis of rotation, a separation line at the axially outer end of the interface surfaces between the radially inner tubular or annular core and the radially outer body.

2. The flanged bearing ring according to claim 1, wherein the part of the groove formed in the radially inner tubular or annular core is obtained in a ridge or shoulder protruding in a radially outer direction and extending in a circumferential direction.

3. The flanged bearing ring according to claim 2, wherein the groove is obtained to a greater extent in the radially outer body, and to a lesser extent in a ridge of the radially inner tubular or annular core.

4. The flanged bearing ring according to claim 1, wherein a ridge has an axially outer radial surface coplanar or substantially flush with an axially outer, radial surface of the flange, the groove separates the outer radial surface of the ridge and the outer radial surface of the flange, and that the sealing ring only partially fills the groove without protruding axially beyond a radial plane in which the outer radial surface of the flange lies.

5. The flanged bearing ring according to claim 4, wherein the sealing ring is entirely axially recessed with respect to the radial plane in which the outer radial surface of the flange lies.

6. The flanged bearing ring according to claim 1, wherein the sealing ring adheres to both the radially inner tubular or annular core and the radially outer body so as to hermetically seal, on the axially outer side of the ring, the interface between the radially inner tubular or annular core and the radially outer body.

7. The flanged bearing ring according to claim 1, wherein the sealing ring is made of silicone resin.

8. The flanged bearing ring according to claim 1, wherein the groove opens in an axially outer direction.

9. A method of manufacturing a flanged bearing ring for the wheel of a motor vehicle, the method comprising the steps of:
   a) providing an annular or tubular core made of a first material having a high toughness, the annular or tubular core forming at least one raceway around a central axis and having a radially outer surface;
   b) forming, around the outer surface of the annular or tubular core, a radially outer body made of a second material lighter than the first material, the radially outer body providing a flange extending radially outwardly around the annular or tubular core, thereby obtaining a flanged ring comprising two different materials joined together as a single piece;
   c) obtaining, simultaneously or subsequently to step b), a groove at the axially outer end of the flanged ring, at a side providing the flange, the groove being formed in part by the radially outer body and in part by the annular or tubular core;
   d) orienting the ring so as to turn the groove upwards; and
   e) casting a polymeric liquid sealant in the groove, thereby obtaining a polymer sealing ring which seals continuously, around the central axis, a line of separation at the axially outer end of the interface surfaces between the annular or tubular core and radially outer body.

* * * * *